US010550019B2

(12) United States Patent
Ramirez et al.

(10) Patent No.: US 10,550,019 B2
(45) Date of Patent: Feb. 4, 2020

(54) AUTOMATED DOSING SYSTEM AND METHOD WITH LIGHT PROFILING FOR WASTEWATER FILTRATION SYSTEM

(71) Applicant: OptikTechnik LLC, Milwaukee, WI (US)

(72) Inventors: Jose Antonio Ramirez, Vernon Hills, IL (US); Johann Rudi Strickler, Milwaukee, WI (US)

(73) Assignee: OptikTechnik LLC, Milwaukee, WI (US)

( * ) Notice: Subject to any disclaimer, the term of this patent is extended or adjusted under 35 U.S.C. 154(b) by 163 days.

(21) Appl. No.: 15/482,665

(22) Filed: Apr. 7, 2017

(65) Prior Publication Data

US 2017/0291834 A1    Oct. 12, 2017

Related U.S. Application Data

(60) Provisional application No. 62/320,264, filed on Apr. 8, 2016.

(51) Int. Cl.
*B01D 21/01* (2006.01)
*B01D 21/30* (2006.01)
(Continued)

(52) U.S. Cl.
CPC ............ *C02F 1/5209* (2013.01); *B01D 21/01* (2013.01); *B01D 21/30* (2013.01); *G01B 11/24* (2013.01);
(Continued)

(58) Field of Classification Search
CPC .......................... C02F 1/5209; C02F 2209/06; C02F 2209/02;
C02F 11/123; C02F 2209/005; C02F 1/008; C02F 1/52; C02F 1/685; C02F 1/686; C02F 1/687; C02F 11/008; C02F 2209/10; C02F 2209/42; G01B 11/25; G01B 11/24; G01B 11/30; G01B 11/303;
(Continued)

(56) References Cited

U.S. PATENT DOCUMENTS 1,973,066 A    9/1934  Hauser et al.
4,576,723 A    3/1986  Eisenlauer et al.
(Continued)

OTHER PUBLICATIONS

International Search Report and Written Opinion for Application No. PCT/US2017/026716 dated Jul. 11, 2017 (11 pages).
(Continued)

*Primary Examiner* — Joseph W Drodge
(74) *Attorney, Agent, or Firm* — Michael Best & Friedrich LLP

(57) ABSTRACT

A surface sensing assembly is in communication with an open channel having a material moveable relative to the open channel. The surface sensing assembly includes a light source directing a light beam toward the material, a photo-detector capturing an image of the light beam interacting with the material, and a controller coupled to the light source, the photo-detector, and at least one actuator. The controller is configured to determine an indication of surface topography of the material based on the image. The controller is also configured to control the at least one actuator to adjust a characteristic of the material based on the indication of surface topography.

19 Claims, 7 Drawing Sheets

(51) Int. Cl.
*C02F 1/52* (2006.01)
*G01B 11/24* (2006.01)
*G01B 11/25* (2006.01)
*C02F 11/123* (2019.01)

(52) U.S. Cl.
CPC ............ *G01B 11/25* (2013.01); *C02F 11/123* (2013.01); *C02F 2209/005* (2013.01); *C02F 2209/02* (2013.01); *C02F 2209/06* (2013.01)

(58) Field of Classification Search
CPC ...... G01B 11/306; B01D 21/01; B01D 21/30; B01D 21/302; B01D 21/34; B01D 33/70; B01D 33/72; B01D 33/804; B01D 33/805; B01D 33/809; G01N 21/85; G01N 21/95; G01N 21/956; G01N 2021/178
USPC ........ 210/94, 96.1, 143, 149, 400, 401, 709, 210/745; 356/337, 338, 343, 121, 601, 356/612, 630
See application file for complete search history.

(56) References Cited

U.S. PATENT DOCUMENTS

| | | | |
|---|---|---|---|
| 4,867,886 A * | 9/1989 | Botkins, Jr. .......... | B01D 33/042 210/709 |
| 5,067,817 A * | 11/1991 | Glenn .................... | G01B 11/24 356/613 |
| 5,133,872 A | 7/1992 | Baldwin et al. | |
| 5,160,439 A * | 11/1992 | Dobrez ................. | C02F 1/5209 210/198.1 |
| 5,240,594 A | 8/1993 | Ho | |
| 5,552,038 A | 9/1996 | Muller et al. | |
| 5,626,766 A | 5/1997 | Cadek et al. | |
| 6,811,706 B1 * | 11/2004 | Wahlberg ............... | G01N 15/04 210/143 |
| 7,037,433 B2 | 5/2006 | Abu-Orf et al. | |
| 8,506,799 B2 | 8/2013 | Jorden et al. | |
| 2005/0088647 A1 | 4/2005 | Shanmugasundram et al. | |
| 2009/0208582 A1 | 8/2009 | Johnston et al. | |
| 2013/0076852 A1 * | 3/2013 | Bai .................... | G03G 15/0409 347/261 |
| 2014/0284267 A1 * | 9/2014 | Jung .................. | B01D 67/0013 210/483 |

OTHER PUBLICATIONS

Seuront, L. et al., "Quantifying Zooplankton Swimming Behavior: The Question of Scale", Handbook of Scaling Methods in Aquatic Ecology: Measurement, Analysis, Simulation, 2004, pp. 333-359, CRC Press LLC.

Orford, J. D. et al., "The use of the fractal dimension to quantify the morphology of irregular-shaped particles", Sedimentology, 1983, vol. 30, pp. 655-668, Department of Geography, Queens University, Belfast, Northern Ireland.

"The "Schmaltz Technique"—optical sectioning principle and associated projected images", pp. 57-59.

Al Momani, Fares A. et al., "Optimization of Polymer Dose Based on Residual Polymer Concentration in Dewatering Supernatant", Water Air Soil Pollut, 2014, 225: 2154, pp. 1-11, Springer International Publishing, Switzerland.

Bache, D. H. et al., "Polymers in Alum Sludge Dewatering: Developments and Control", The Journal, 2003, vol. 17, No. 2, pp. 106-110, Department of Civil Engineering, University of Strathclyde, Glasgow, Scotland, UK; Scottish Water Club, Clatto Treatment Works, Dundee, Scotland, UK.

Abu-Orf, Mohammad M. et al., "Automatic control of polymer dose using the streaming current detector", Water Environment Research, 1998, vol. 70, No. 5, pp. 1005-1018.

Byun, Seokjong et al., "Automatic control of polymer dosage using streaming potential for waterworks sludge conditioning", Separation and Purification Technology, 2007, vol. 57, pp. 230-236, Water Environment and Remediation Center, Korea Institute of Science and Technology, Seoul, Korea.

European Patent Office Search Report for Application No. 17779956.6 dated Dec. 19, 2018, 9 pages.

* cited by examiner

AUTOMATED DOSING SYSTEM AND METHOD WITH LIGHT PROFILING FOR WASTEWATER FILTRATION SYSTEM

CROSS-REFERENCE TO RELATED APPLICATIONS

This application claims priority to U.S. Provisional Patent Application No. 62/320,264, filed Apr. 8, 2016, the entire content of which is incorporated by reference herein.

BACKGROUND

Chemical coagulation followed by flocculation is used in both water and wastewater treatment. The coagulation/flocculation process includes dosing of specialty chemicals and sometimes adjustment of pH, and may be susceptible to changes in the incoming water, such as changes in temperature, turbidity, and/or color. The underlying principles in chemical coagulation are destabilization of the suspended particles by charge neutralization, facilitation of adsorption or reaction of colloidal and dissolved substances to suspended particles, and creation of flocculant particles that will sweep through the water, enmeshing small suspended, colloidal and dissolved material as they move.

SUMMARY

The complexity of these mechanisms renders controlling the coagulation and flocculation process a complex task. The task becomes even more complicated as conditions in the inlet water change, such as temperature, feed/feces/other solids concentration ratio, etc. Control of the process, such as through chemical dosage adjustment, may be done manually by an operator using specialized, costly equipment with substantial maintenance and training requirements that are not always reliable, or in the case of many small plants, not done at all.

Some embodiments of the present invention provide systems and methods for efficient coagulation/flocculation control in wastewater treatment. For example, some embodiments avoid periods of operation at lower or higher doses of coagulation chemicals and flocculation aids than desired (e.g., for optimal coagulation/flocculation). Under-dosing coagulation chemicals and flocculation aids can result in poor pollutant and contaminant removal by downstream processes. Over-dosage of coagulation and flocculation chemicals can not only result in higher direct costs (e.g., for added chemical use), but also higher indirect costs (e.g., for higher sludge volumes, higher frequency of filter backwashing/cleaning, and lower run times) and possibly lower quality treated water. Additionally, over-dosage constitutes an increased carbon footprint contribution of the water treatment process from a lifecycle point of view.

In one embodiment, a flocculation dosing system includes a mixing chamber configured to receive wastewater and flocculant material. The mixing chamber is configured to mix the wastewater and the flocculant material together to form a compound solution. The flocculation dosing system also includes a conveyor that receives the compound solution. A liquid content of the compound solution decreases as the conveyor moves the compound solution from a first end of the conveyor toward a second end of the conveyor. The flocculation dosing system further includes a surface sensing assembly in communication with the conveyor. The surface sensing assembly includes a light source directing a light beam toward the compound solution on the conveyor, a photo-detector capturing an image of the light beam interacting with the compound solution, and a controller coupled to the light source, the photo-detector, and at least one actuator. The controller is configured to determine an indication of surface topography of the compound solution based on the image. The controller is also configured to control the at least one actuator to adjust a characteristic of the compound solution based on the indication of surface topography.

In another embodiment, a surface sensing assembly is in communication with a material having a variable surface topography. The surface sensing assembly includes a light source directing a light beam toward the material, a photo-detector capturing an image of the light beam interacting with the material, and a controller coupled to the light source, the photo-detector, and at least one actuator. The controller is configured to determine an indication of surface topography of the material based on the image. The controller is also configured to control the at least one actuator to adjust a characteristic of the material based on the indication of surface topography.

In yet another embodiment, a method is provided for controlling a desired surface topography of a material having a variable surface topography. The method includes directing a light source toward the material, capturing an image of the light source interacting with the material, and generating, by a controller, an indication of surface topography of the material based on the image.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
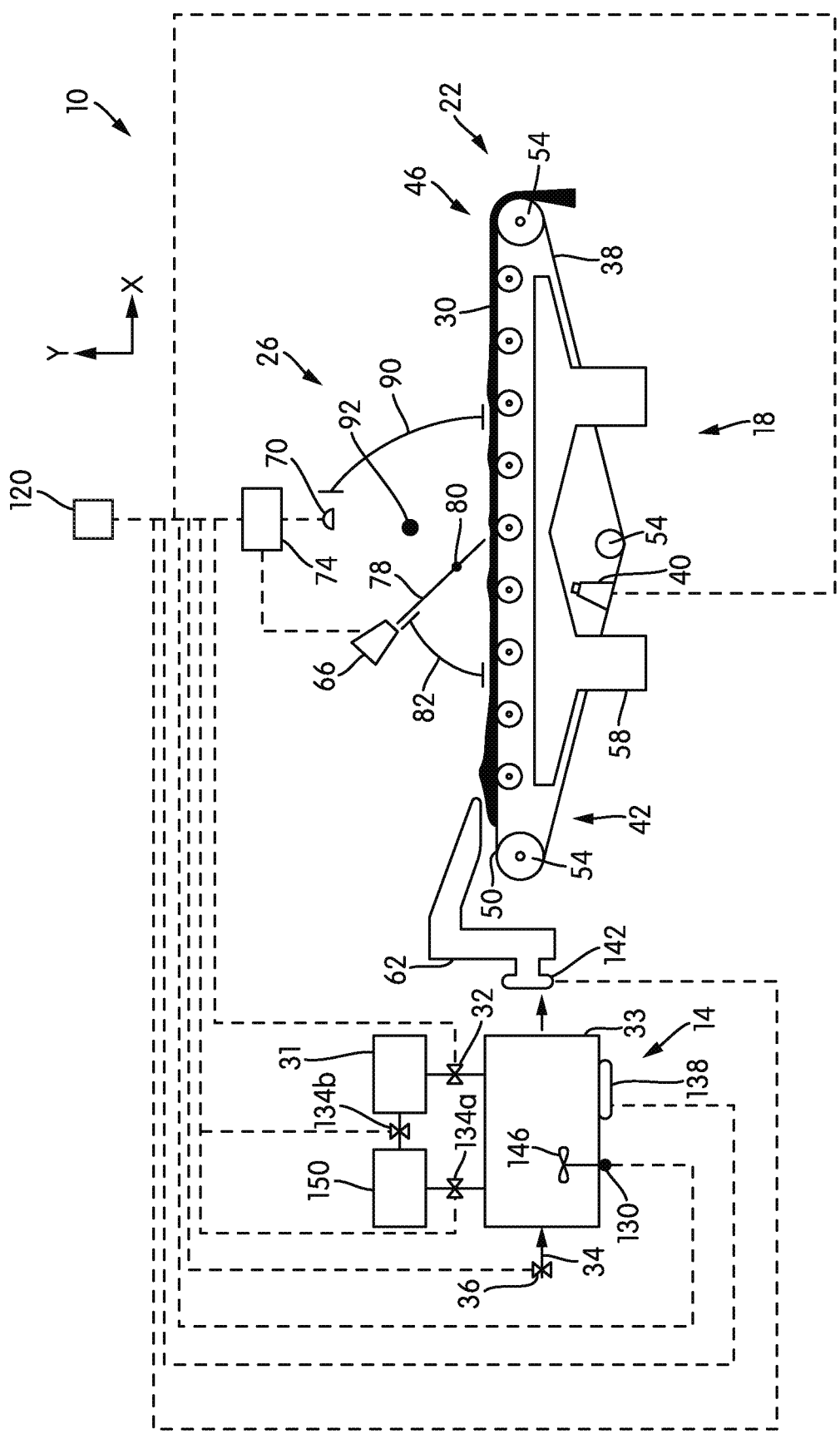
FIG. 1 is a side view of a flocculation dosing system according to one embodiment of the invention supporting a compound solution on a conveyor belt.

A coagulation or flocculation dosing system 10 is illustrated in FIG. 1 and includes a mixing phase or assembly 14, a filtration phase or assembly 18, a collection phase or assembly 22, and a surface topography sensing assembly or surface sensing assembly 26. The illustrated mixing phase 14 is configured to mix a determined ratio of wastewater and a flocculant material to form a sludge or compound solution or flowing material 30. The flocculant material is contained within a doser 31 having a doser valve 32 (e.g., a doser actuator) that is in communication with a mixing chamber 33 with the doser valve 32 configured to regulate an amount of flocculant material entering the mixing chamber 33. In the illustrated embodiment, the flocculant material is a flocculant polymer in solid particle state that is soluble with the wastewater. For example, the flocculant polymer is Polydyne® SNF 321. In other embodiments, the flocculant material may be a chemical (e.g., in a solid, liquid, or gas state) that is soluble with the wastewater. The wastewater also enters the mixing chamber 33 via a wastewater valve 36 (e.g., a wastewater actuator) with the wastewater valve 36 positioned upstream of the mixing chamber 33 and configured to regulate an amount of wastewater entering the mixing chamber 33. A ratio of the flocculant material and the wastewater being mixed within the mixing chamber 33 is about 120 pounds of flocculant material per about a ton of wastewater. In other embodiments, the ratio may be about 150 pounds of flocculant material per about a ton of wastewater. The wastewater enters the mixing chamber 33 at an incoming flow rate 34 (e.g., 900 gallons per minute). The flocculant materials, ratios, and flow rates are merely examples and are not limiting as other materials, ratios, and flow rates are used in some embodiments.

The illustrated filtration assembly 18 is a gravity belt thickener in FIG. 1. Alternatively, the filtration assembly 18 may be a belt filter press. The illustrated filtration assembly 18 includes a continuous conveyor belt or a material support structure 38 having a first or upstream end 42 and a second or downstream end 46 that is driven by a motor 40 (e.g., a conveyor actuator). The material support structure 38 is configured to direct the compound solution 30 in a desired direction. The conveyor belt 38 defines a support surface 50 extending in the "X" and "Z" directions (FIG. 3) and is porous (e.g., includes apertures) to allow liquid to pass through the conveyor belt 38, but does not allow solid material to pass through the conveyor belt 38. The filtration assembly 18 also includes dividers 48 (FIG. 3) located between the ends 42, 46 of the conveyor belt 38. The illustrated dividers 48 are designed to separate the conveyor belt 38 into three portions 52a, 52b, 52c along the "Z" direction (generically referred to as portion(s) 52). In other embodiments, the filtration assembly 18 may include more or less than two dividers 48 to separate the conveyor belt 38 into more or less than three portions 52. In some embodiments, the filtration assembly 18 includes no dividers. A plurality of guide rollers 54 support the conveyor belt 38, and the plurality of guide rollers 54 are supported by a frame 58. The filtration assembly 18 also includes a conduit 62 adjacent the first end 42 providing communication with the mixing chamber 33 and is configured to convey the compound solution 30 onto the conveyor belt 38. In some embodiments, the mixing chamber 33 and the conduit 62 are integral and form one component that mixes and conveys the compound solution 30 onto the conveyor belt 38, and in other embodiments, the mixing chamber 33 and the conduit 62 are separate, communicating components.

The collection phase 22 is adjacent the second end 46 of the conveyor belt 38 and is configured to collect the remaining compound solution 30 exiting the filtration subassembly 18. After the solution 30 is collected, the solution 30 is disposed of (e.g., as a fertilizer).

Figure 2:
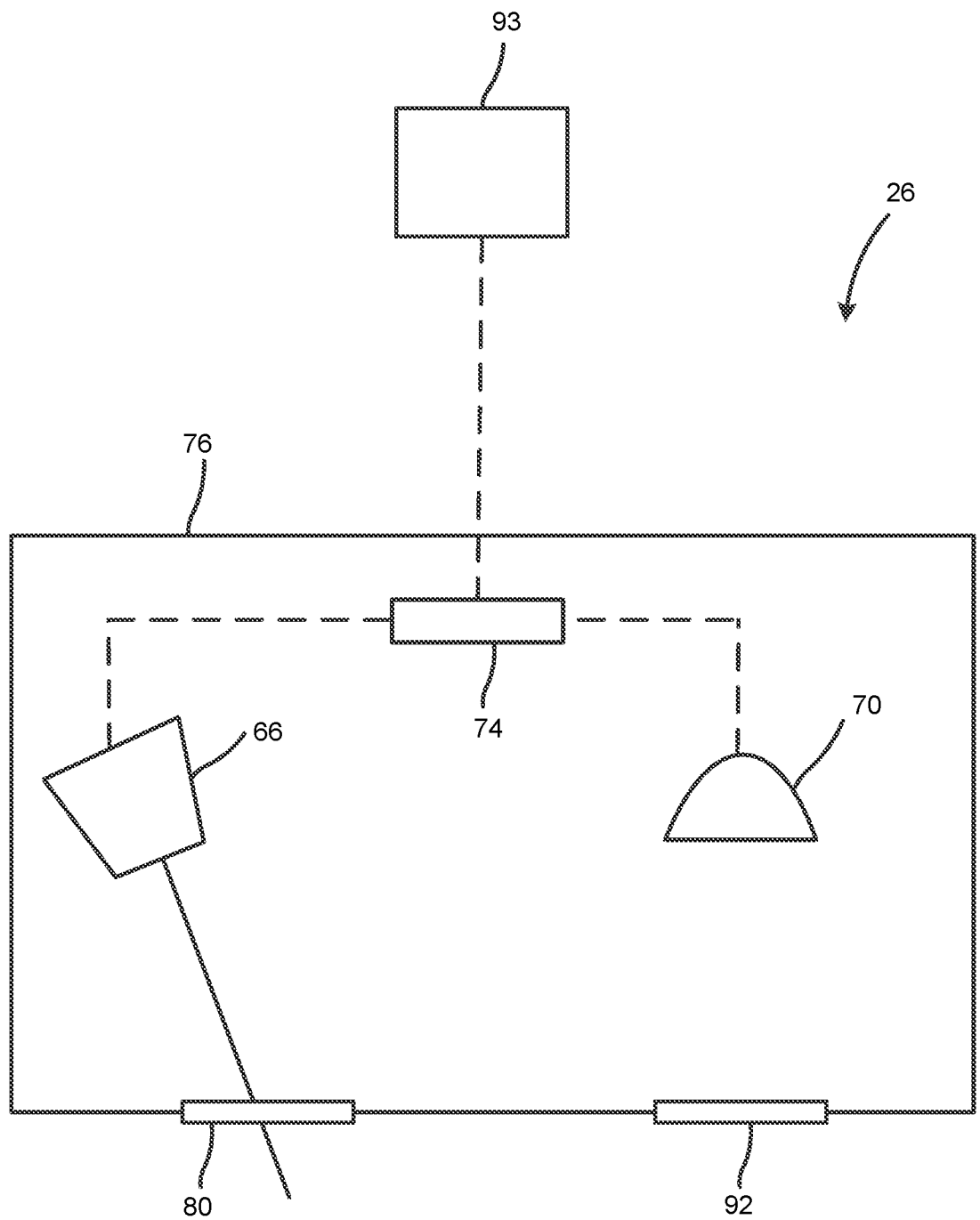
FIG. 2 is schematic view of a surface sensing assembly of the flocculation dosing system of FIG. 1.

With continued reference to FIGS. 1 and 2, the topography sensing assembly 26 includes a light source 66 and a photo-detector 70 both electrically coupled to a controller 74. In one embodiment, the light source 66, the photo-detector 70, and the controller 74 can be supported within a housing 76. The illustrated controller 74 controls the light source 66 to emit light and also receives detection data from the photo-detector 70. The topography sensing assembly 26 may also be referred to as an optical profilometer or light sectioning device. The topography sensing assembly 26 is used to generate an indication of a surface topography of the compound solution 30 on the support surface 50. The indication of surface topography is, for example, an indication of surface roughness of the compound solution 30 or a slope of the compound solution 30, as described in further detail below. In the illustrated embodiment, the topography sensing assembly 26 (e.g., the housing 76) is positioned in the middle of the first and the second ends 42, 46; however, in other embodiments, the topography sensing assembly 26 may be positioned elsewhere relative to the filtration assembly 18. For example, the topography sensing assembly 26 may be positioned closer to the second end 46 than the first end 42 of the conveyor belt 38 or vice versa.

Figure 3:
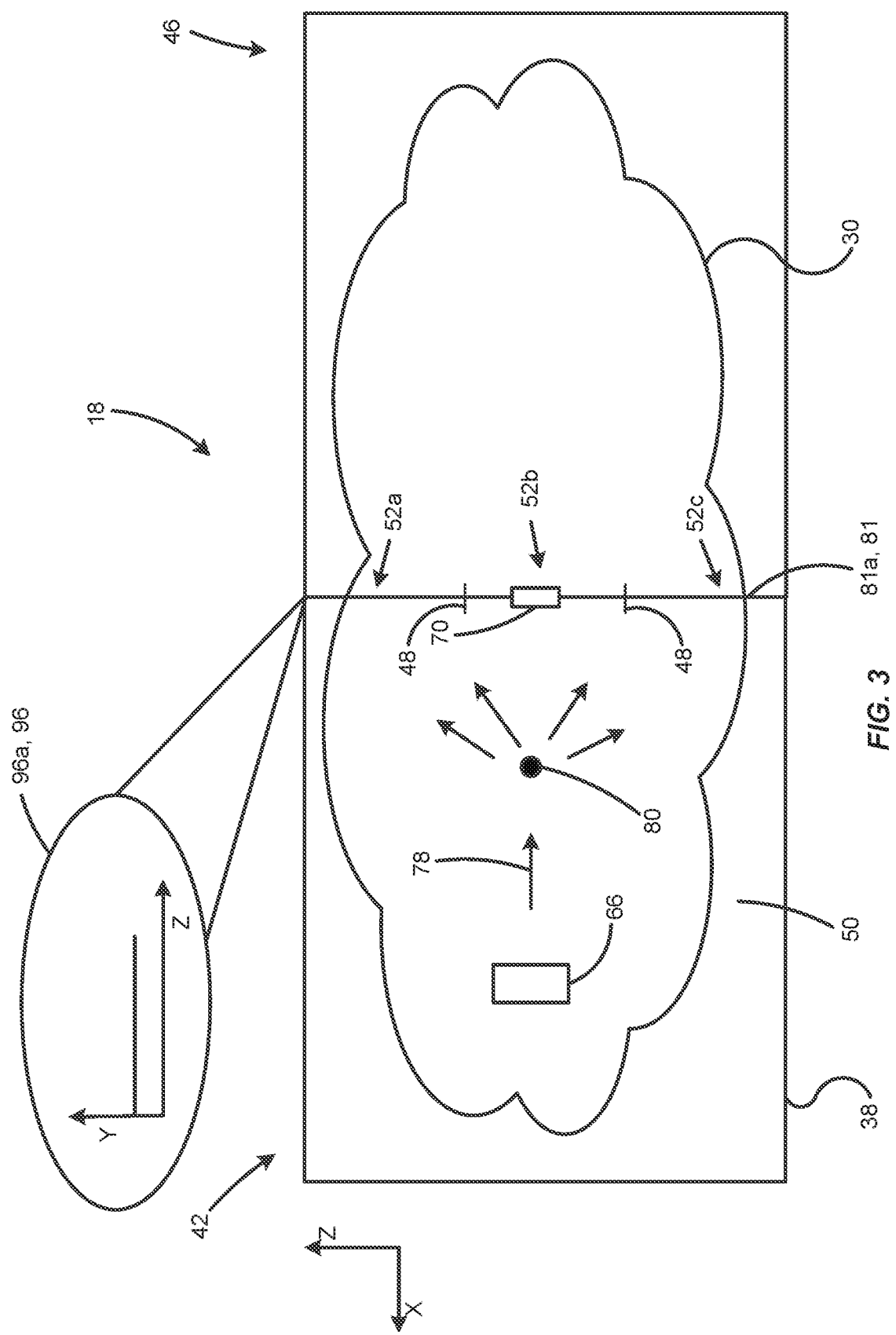
FIG. 3 is a top view of a portion the flocculation dosing system of FIG. 1 illustrating a first surface topography of the compound solution supported on the conveyor belt.

With reference to FIG. 3, the illustrated light source 66 is a light emitting diode (LED) source, an incandescent source, or another light source (e.g., infrared) that directs a light beam 78 through a first lens 80 toward the support surface 50 of the conveyor belt 38. In other embodiments, the light beam 78 may pass through more than one lens. In further embodiments, the light source 66 can be one or more mirrors or prisms that reflect light from another light source to the first lens 80 or the support surface 50. In yet further embodiments, the topography sensing assembly 26 may include more than one light source 66 positioned relative to the conveyor belt 38 along the "Z" direction, along the "X" direction, and/or along the "Z" and "X" directions (e.g., each light source 66 may align with another photo-detector 70 and/or a portion 52). In one embodiment, the first lens 80 can be formed from a portion of the housing 76 (FIG. 2). In further embodiments, the first lens 80 may be positioned within the housing 76 or outside the housing 76. When the light beam 78 passes through the first lens 80, the light beam 78 scatters onto the conveyor belt 38 to form a scan line 81 (shown as scan line 81a in FIG. 3). In the illustrated embodiment, the scan line 81 extends substantially the width of the conveyor belt 38 in the "Z" direction. In other embodiments, the scan line 81 may extend into one of the portions 52 of the conveyor belt 38. In further embodiments, the scan line 81 may be a scan area that is associated with an area on the conveyor belt 38. In one embodiment, the scan line 81 is stationary relative to the conveyor belt. In another embodiment, the scan line 81 is moveable (e.g., back and forth in the "X" direction or the "Z" direction) relative to the conveyor belt 38. The light beam 78 is oriented relative to the support surface 50 at a first angle 82 that is about 45 degrees (FIG. 1). In one embodiment, the first angle 82 may be between about 10 degrees and about 80 degrees. In other embodiments, the first angle 82 may be between about 30 degrees and about 70 degrees. In further embodiments, the first angle 82 may be between about 40 degrees and about 60 degrees. In yet further embodiments, the first angle 82 may be adjustable (e.g., adjustable between about 30 degrees and about 70 degrees).

The illustrated photo-detector 70 (e.g., two-dimensional camera) is configured to capture an image 96 of the scan line 81 at a particular point in time. FIGS. 3, 4, 5, and 6 illustrate different scan lines 81 (labeled as scan lines 81a, 81b, 81c, and 81*d*, respectively) and images 96 (labeled 96*a*, 96*b*, 96*c*, and 96*d*) that are produced by different surface roughnesses or different surface topographies of the compound solution 30, as described in detail below. In one embodiment, a second lens 92 is positioned between the scan line 81 and the photo-detector 70 (FIG. 1). The second lens 92 is configured to focus and/or magnify the image 96 taken by the photo-detector 70. In other embodiments, more than one lens may be positioned between the scan line 81 and the photo-detector 70. In further embodiments, the topography sensing assembly 26 may include more than one photo-detector 70 positioned relative to the conveyor belt 38 along the "Z" direction, and each of the photo-detectors 70 may generally align with a respective light source 66 or one of the portions 52 in the "X" direction. In one embodiment, the second lens 92 can be formed from a portion of the housing 76 (FIG. 2). In further embodiments, the second lens 92 may be positioned within the housing 76 or outside the housing 76. In the illustrated embodiment, the photo-detector 70 is oriented relative to the support surface 50 at a second angle 90 that is about 90 degrees (FIG. 1). In other embodiments, the second angle 90 may be between about 30 degrees and about 45 degrees. In further embodiments, the first angle 82 may be the same as the second angle 90, and/or the second angle 90 may be between about 10 degrees and about 90 degrees. In yet further embodiments, the second angle 90 may be adjustable (e.g., adjustable between about 30 degrees and about 90 degrees).

The illustrated controller (e.g., an electronic processor) 74 can be a proportional, a proportional-integral, a proportional-integral-derivative controller, or another type of controller, which may include an electronic processor and memory. Along with being electrically coupled to the light source 66 and the photo-detector 70, the controller 74 is also electrically coupled to at least one actuator 93, for example, of the mixing phase 14 (FIG. 1). In one embodiment, the actuator 93 can be the doser valve 32, the wastewater valve 36, or the doser valve 32 and the wastewater valve 36. The illustrated controller 74 is configured to regulate the ratio of the flocculant material and the wastewater conveyed onto the filtration assembly 18. In particular, the controller 74 emits a first control signal to the wastewater valve 36 to control the rate of wastewater input into the mixing chamber 33, and also emits a second control signal to the doser valve 32 to control the rate of flocculant material input into the mixing chamber 33.

Figure 5:
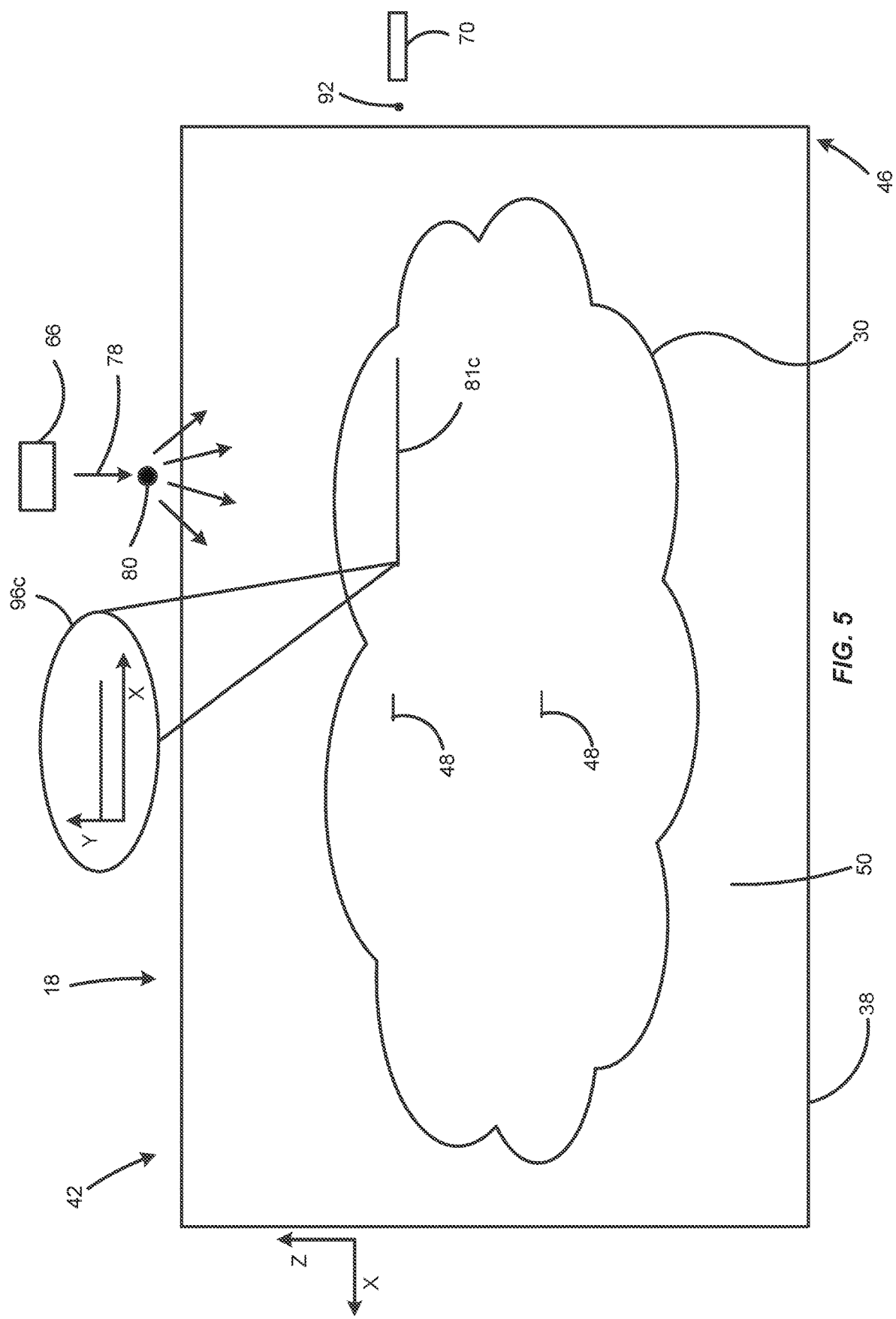
FIG. 5 is a top view of a portion of the flocculation dosing system of FIG. 1 including a surface sensing assembly according to another embodiment.

In other embodiments as shown in FIG. 5, the scan line 81 can be oriented substantially parallel to a length of the conveyor 38 (e.g., the scan line 81 is substantially parallel to the X axis). Stated another way, as shown in FIG. 5, the scan line 81 is oriented to extend along the direction of flow or movement of the compound solution 30 on the conveyor 38. For example, the light source 66 can be positioned outside of a perimeter of the conveyor 38 (in the X-Z plane) adjacent a longitudinal side (along the X axis) of the conveyor 38. As such, the light source 66 emits the light beam 78 toward the first lens 80 to produce the scan line 81 that is oriented along the length of the conveyor 38. In one embodiment, the scan line 81 is positioned away from the dividers 48 and downstream of the dividers 48 so that the compound solution 30, which builds up around the dividers 48, does not affect the surface topography of the compound solution 30 interacting with the scan line 81. In addition, the photo-detector 70 can be positioned outside of the perimeter of the conveyor 38 (in the X-Z plane) adjacent a lateral side (along the Z axis) of the conveyor 38. For example, the photo-detector 70 aligns with the scan line 81 along the X axis. In other embodiments, the light source 66 can be positioned outside of the perimeter of the conveyor 38 (in the X-Z plane) adjacent the lateral side of the conveyor 38 while still producing the scan line 81 that is substantially parallel to the X axis, and/or the photo-detector 70 can be positioned outside of the perimeter of the conveyor 38 (in the X-Z plane) adjacent the longitudinal side of the conveyor 38. In still further embodiments, the light source 66 and photo-detector 70 can be positioned within the perimeter of the conveyor 38 (in the X-Z plane) to generate and measure the scan line 81 along the length of the conveyor 38 as illustrated in FIG. 5.

Figure 6:
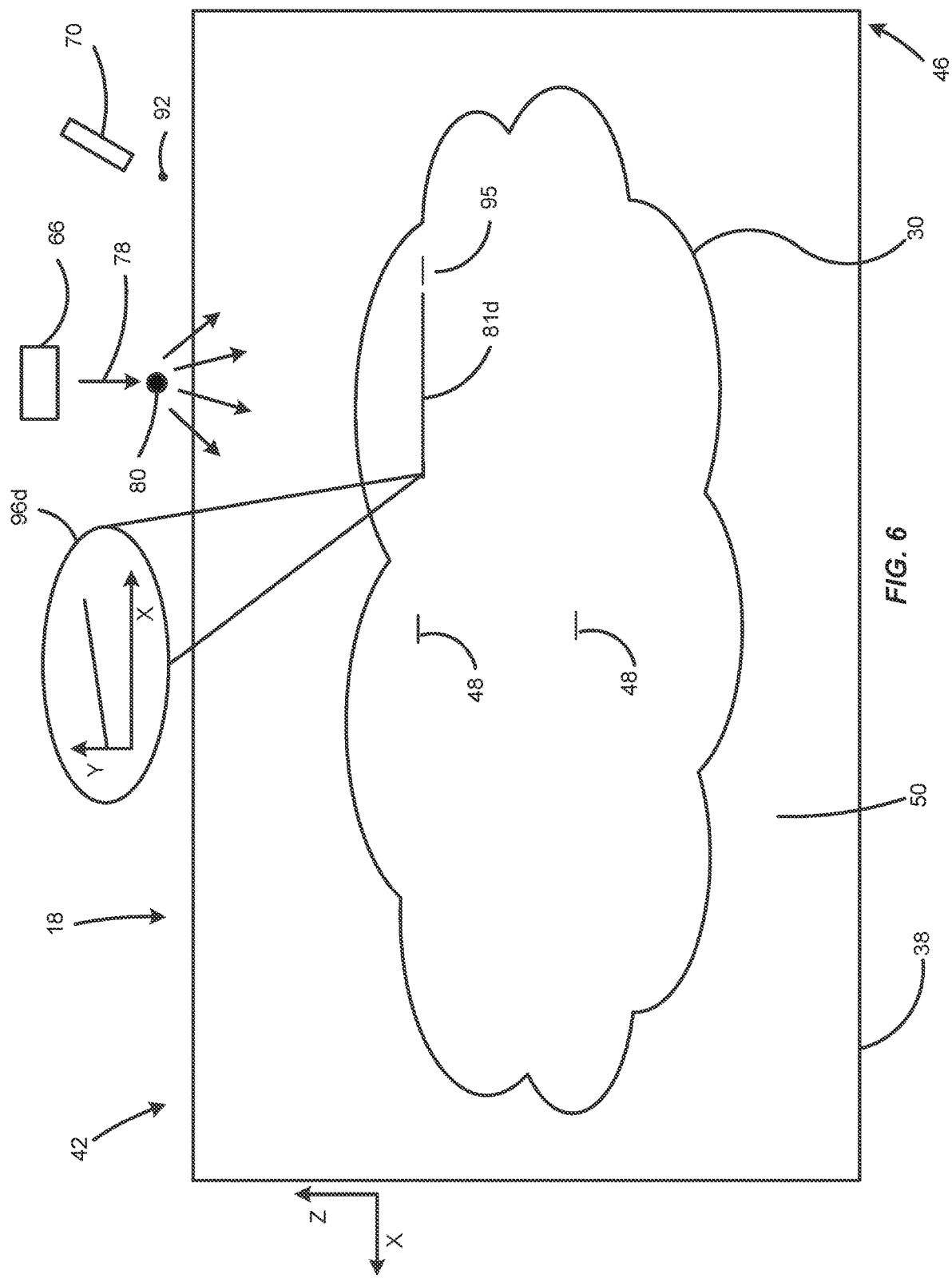
FIG. 6 is a top view of a portion of the flocculation dosing system of FIG. 1 including a surface sensing assembly according to another embodiment.

In the embodiment shown in FIG. 6, the scan line 81 is also oriented substantially parallel to a length of the conveyor 38 (e.g., the scan line 81 is substantially parallel to the X axis). Stated another way, as shown in FIG. 6, the scan line 81 is oriented to extend along the direction of flow or movement of the compound solution 30 on the conveyor 38. For example, the light source 66 can be positioned outside of a perimeter of the conveyor 38 (in the X-Z plane) adjacent a longitudinal side (along the X axis) of the conveyor 38. As such, the light source 66 emits the light beam 78 toward the first lens 80 to produce the scan line 81 that is oriented along the length of the conveyor 38. In this embodiment, the scan line 81 is positioned in the area upstream of an obstacle 95 positioned along the conveyor 38, which may be a divider, so as to measure an amount of buildup of the compound solution 30 in front of the obstacle 95. The more water content within the compound solution 30, the less buildup in front of the obstacle 95; while, the less water content within the compound solution 30, the more buildup in front of the obstacle 95. In addition, the photo-detector 70 can be positioned outside of the perimeter of the conveyor 38 (in the X-Z plane) adjacent to the light source 66. In other embodiments, one or both of the light source 66 and the photo-detector 70 can be positioned outside of the perimeter of the conveyor 38 (in the X-Z plane) adjacent the longitudinal side of the conveyor 38. In still further embodiments, the light source 66 and photo-detector 70 can be positioned within the perimeter of the conveyor 38 (in the X-Z plane) to generate and measure the scan line 81 along the length of the conveyor 38 as illustrated in FIG. 6.

Figure 7:
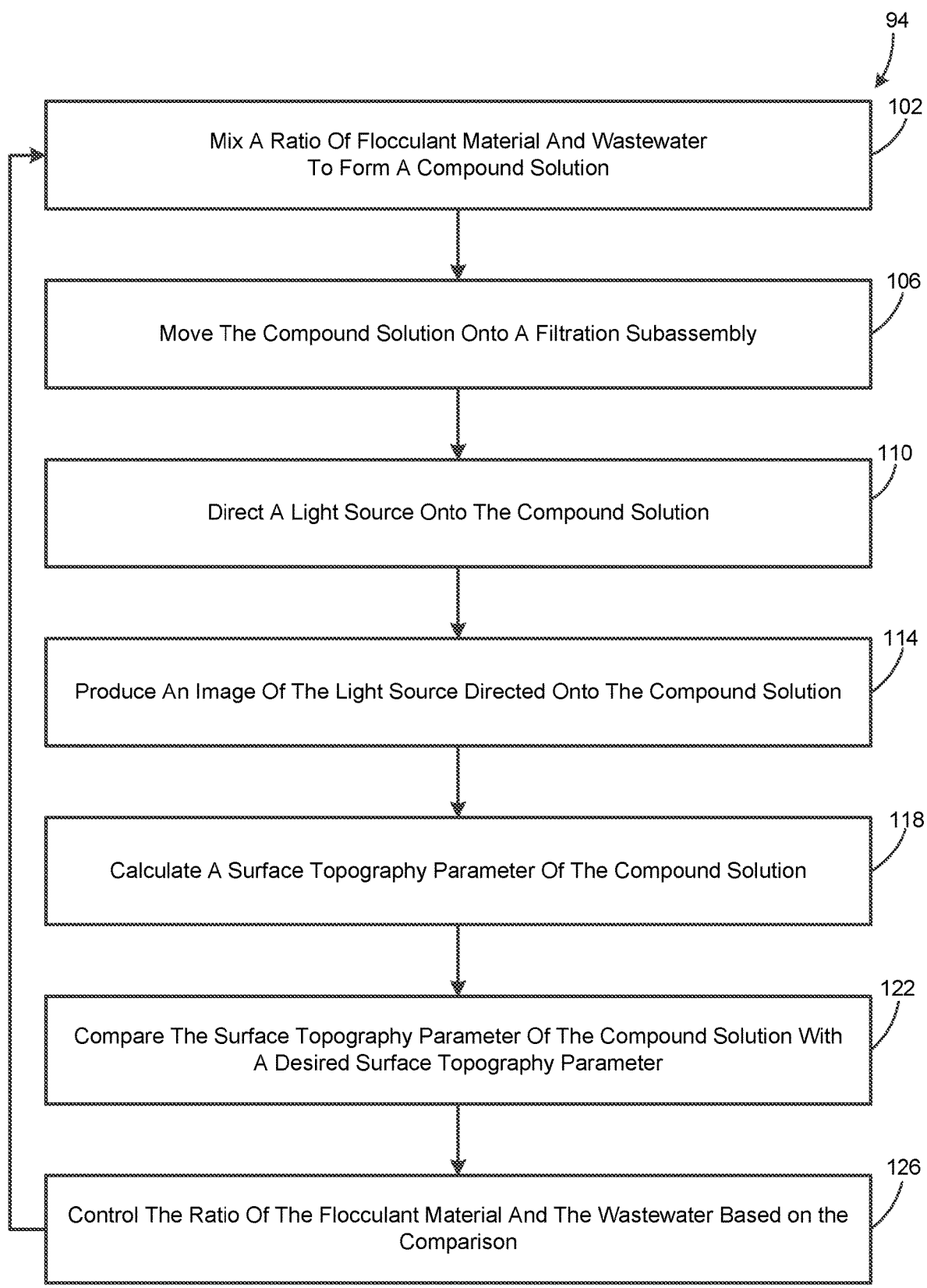
FIG. 7 illustrates a method of operation of the flocculation dosing system of FIG. 1.

With reference to FIG. 7, which illustrates a method 94 of operation of the flocculation dosing system 10, the flocculant material is added to and mixed with the wastewater to form the compound solution 30 within the mixing chamber 33 (step 102). Initially, the ratio of wastewater to flocculation material may be set to a default value. For instance, the controller 74 may control the wastewater valve 36 and the doser valve 32 to be at default positions to obtain the default ratio of the compound solution 30. The compound solution 30 then moves onto the support surface 50 of the conveyor belt 38 via the conduit 62 (step 106) as the conveyor belt 38 continuously rotates about the guide rollers 54. Because the conveyor belt 38 is porous, the liquid wastewater is separated from the solid wastewater particles by moving through the conveyor belt 38 to be extracted from the flocculation dosing system 10. In general, the compound solution 30 near the first end 42 includes more water/liquid content (e.g., a lower surface roughness or a constant surface topography) than the compound solution 30 near the second end 46 (e.g., a higher surface roughness or a variable surface topography). In other words, the water/liquid content of the compound solution 30 decreases as the compound solution 30 moves toward the second end 46.

Figure 4:
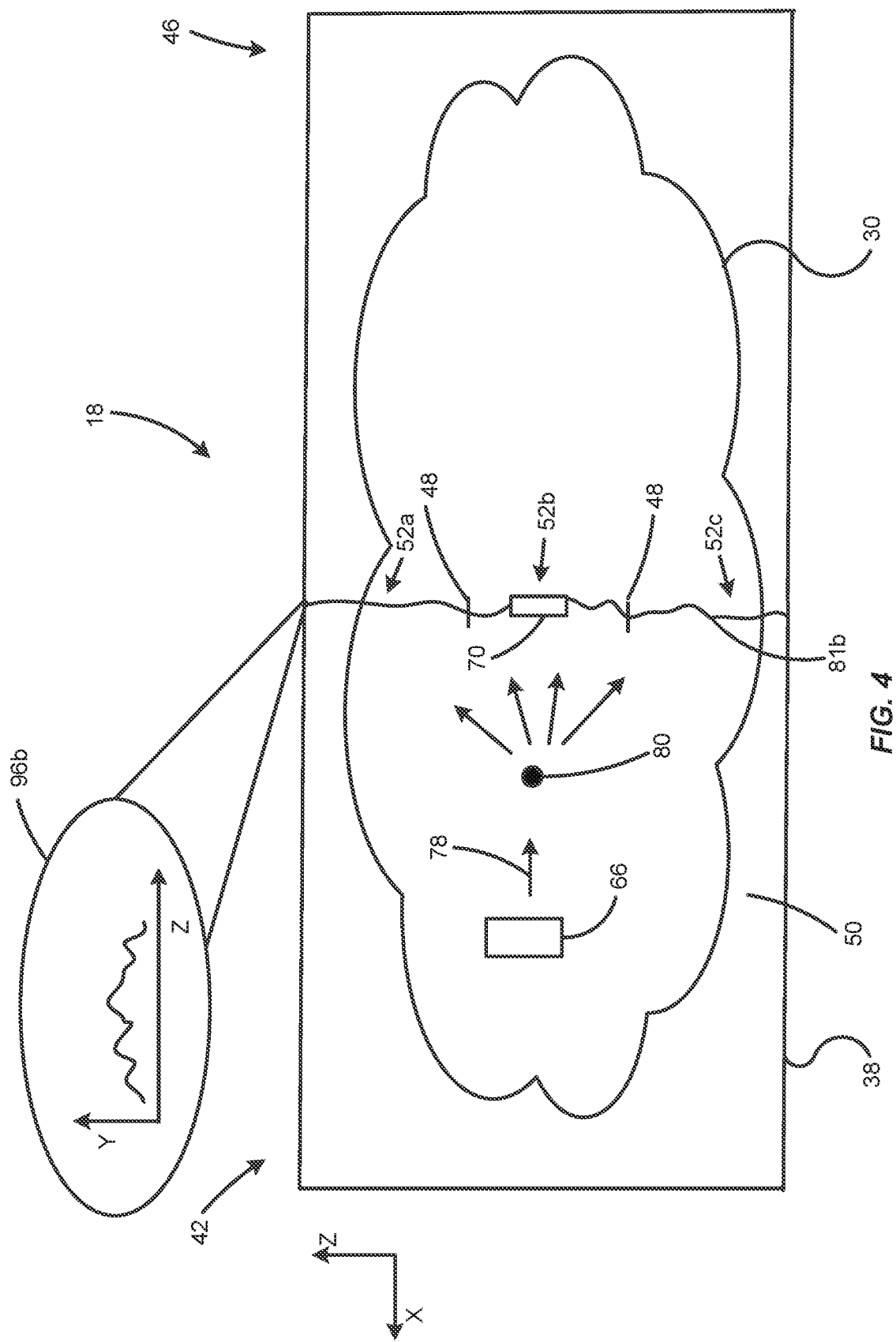
FIG. 4 is a top view of a portion the flocculation dosing system of FIG. 1 illustrating a second surface topography of the compound solution supported on the conveyor belt.

As the compound solution 30 moves towards the second end 46, the topography sensing assembly 26 measures a surface roughness or a surface topography (along the "Y"

direction relative to the conveyor belt 38) of the compound solution 30. FIGS. 3 and 4 illustrate a detailed view of examples of different surface roughnesses of the compound solution 30. FIG. 3 illustrates a low surface roughness (e.g., the compound solution 30 is flat). When the light source 66 directs the light beam 78 onto the compound solution 30 (step 110) through the first lens 80, the instantaneous scan line profile or image 96*a* of the scan line 81*a* is captured by the photo-detector 70 (step 114). In other words, the photo-detector 70 captures an image 96 of the light beam 78 interacting with the compound solution 30. Because the surface roughness is flat, the scan line 81*a* is a relatively linear line. In contrast, FIG. 4 illustrates a relatively high surface roughness (e.g., the compound solution 30 is rough). When the light source 66 directs the light beam 78 onto the compound solution 30 (step 110) through the first lens 80, the image 96*b* of the scan line 81*b* is created by the photo-detector 70 (step 114). Because the surface roughness is high, the scan line 81*b* represents a non-linear line because the light beam 78 follows the contours of the compound solution 30.

When viewed from the perspective shown in FIG. 4, peaks in the compound solution 30 (in the "Y" direction) will cause the scan line 81*b* to bend to the right, while valleys in the compound solution 30 (in the "Y" direction) will cause the scan line 80*b* to bend to the left. The higher the peak and lower the valley, the greater the bend of the scan line 81*b*. This bending is exaggerated by the light source 66 being oriented at the first angle 82. Accordingly, a two-dimensional image captured by the photo-detector 70, such as image 96*b*, illustrates the surface roughness.

In one embodiment, the photo-detector 70 may produce an image 96 of the entire portion 52*b*. In another embodiment, the photo-detector 70 may produce an image 96 of a magnified section of the portion 52*b* to amplify the contours of the scan line 81. Step 118 illustrates the controller 74 calculating (e.g., determining) a surface topography parameter (e.g., a fractal dimension parameter ($D_f$)) from the image 96. In other words, step 118 illustrates the controller 74 generating an indication of surface topography of the compound solution 30 based on the image 96. The surface topography parameter (e.g., the indication of surface roughness or surface topography) is used to represent a water content of a portion of the compound solution 30 at a moment in time. In one embodiment, the controller 74 generates the surface topography parameter based on the complexity of the scan line 81 (e.g., the degree of curvature or straightness that the scan line 81 represents). In another embodiment, the controller 74 generates the surface topography parameter based on an average rate of change of a slope (e.g., in the Y-Z plane) of the scan line 81. For example, when the compound solution 30 includes a high water content, the average slope of the scan line 81 will be substantially flat (e.g., substantially parallel) relative to the support surface 50, and when the compound solution 30 includes a low water content, the average slope of the scan line 81 will be uneven (e.g., oriented at a non-parallel angle) relative to the support surface 50. In some embodiments, and with reference to FIG. 6, for example, the slope of the line in the image 96*d* indicates the amount of buildup of the compound solution 30 in front of the obstacle 95. The greater (i.e., steeper) the slope, the less water content, and the lower the slope, the more water content within the compound solution 30. In some embodiments, the surface topography parameter is an average deviation of the actual scan line 81 relative to a known or baseline scan line value. In other embodiments, the surface topography parameter is calculated by an algorithm that analyzes segments of the scan line 81 (e.g., in a grid array). In further embodiments, other algorithms (e.g., an averaging algorithm that omits outliers) are used to calculate the surface topography parameter from the image 96.

In one embodiment, the box-counting method may be used to calculate the surface topography parameter in step 118. In the box-counting method, a regular grid of pixels of length λ are superimposed on the image 96 and the number of pixels occupied by the scan line 81 are counted. The surface topography parameter, $D_f$, is then found using the following equation:

$$N(\lambda)=k_2\lambda^{-D_f}$$

where λ is the box size, N(λ) is the number of boxes occupied by the scan line 81, $k_2$ is a constant. The surface topography parameter $D_f$ is estimated from the slope of the linear trend of the log-log plot of the number of boxes occupied by the scan line N(λ) versus the box size λ. Steps 110, 114, and 118 may be collectively referred to as a step of determining (e.g., generating) an actual physical profile of the compound solution 30. In one embodiment, the controller 74 displays the indication of surface topography of the compound solution 30 on a display 120 (FIG. 1) after step 118. The display 120, in turn, can be monitored by an operator of the flocculation dosing system 10.

Step 122 illustrates the controller 74 comparing the surface topography parameter $D_f$ of the compound solution 30 with a desired surface topography parameter. In step 126, the controller 74 will control the ratio of flocculant material to wastewater based on the comparison of step 122. For example, if the surface topography parameter of the compound solution 30 is smoother than the desired surface topography parameter (e.g., lower than desired surface topography of the compound solution 30), the controller 74 will control the ratio of the flocculant material and the wastewater to increase the amount of flocculant material relative to the wastewater. Inversely, if the surface topography parameter is rougher than the desired surface topography parameter (e.g., higher than desired surface roughness of the compound solution 30), the controller 74 will control the ratio of the flocculant material and the wastewater to reduce the amount of flocculant material relative to the wastewater. In some embodiments, the controller 74 will control the ratio by controlling the doser actuator 32 to increase or decrease the amount of flocculant introduced into the mixing chamber 33. In some embodiments, the controller 74 will control the ratio by controlling the wastewater actuator 36 to increase or decrease the amount of wastewater introduced into the mixing chamber 33. In some embodiments, the controller 74 will control the ratio by controlling both the wastewater actuator 36 to increase or decrease the amount of wastewater introduced into the mixing chamber 33 and the doser actuator 32 to increase or decrease the amount of flocculant introduced into the mixing chamber 33.

Consequently, using the method 94, the illustrated controller 74 will automatically and continuously control the ratio of flocculant material to wastewater to reach a desired surface topography of the compound solution 30.

In some embodiments, the desired surface topography parameter may be received by the controller 74 (e.g., in response to user input on a keypad) before or during the method 94. The desired surface topography parameter is selected to attain a desired water content level of the compound solution 30 (e.g., a desired characteristic of the compound solution 30). The desired water content level may be selected to reduce or minimize the flocculant material used, to increase or maximize the wastewater flow into the system 10, to increase or maximize the efficiency of the system 10, or a combination thereof. Generally, the more flocculant material added to the mixing chamber 33, the less water content in the compound solution 30 and the rougher the surface of the compound solution 30. Similarly, the less flocculant material added to the mixing chamber 33, the more water content in the compound solution 30 and the smoother the surface of the compound solution.

In some embodiments, in addition to or in place of controlling the ratio of flocculant material to wastewater in the mixing chamber 33 to control the surface topography of the compound solution 30, the controller 74 may control a mixing rate of flocculant material and the wastewater (e.g., via a mixing actuator or motor 130), control the pH level of the compound solution 30 (e.g., via pH doser actuator or valve 134a, 134b), control a temperature of the compound solution 30 (e.g., via a heating actuator or element 138 that is in coupled to the mixing chamber 33), control the volumetric flow rate of the compound solution 30 fed to the flocculation dosing system 10 (e.g., via an inlet flow actuator or valve 142), or a combination thereof. In further embodiments, in addition to or in place of controlling the mixing phase 14, the controller 74 may control the filtration assembly 18 by controlling the speed of the conveyor 38 (e.g., via the conveyor actuator or motor 40). With reference to FIGS. 1 and 2, the at least one actuator 93 can be the doser valve 32, the wastewater valve 36, the conveyor motor 40, the mixing actuator 130, the pH doser valve 134a, the pH doser valve 134b, the heating element 138, the inlet flow valve 142, or any combination thereof. In other embodiments, the controller 74 can control the at least one actuator 93 and the display 120 simultaneously or separately. Adjusting the mixing rate, pH level, temperature of the compound solution 30, volumetric flow rate of the compound solution 30, and speed of the conveyor 38 can change the water content level (and, therefore, the surface roughness/characteristic) of the compound solution 30. In some embodiments, the controller 74 will control the ratio by controlling the mixing rate of the flocculant material and the wastewater within the mixing chamber 33. For example, the controller 74 may operate a mixing blade 146 positioned within the mixing chamber 33 via the mixing actuator 130 to control a mixing rate thereof, e.g., by increasing or decreasing a mixing rotational velocity of the mixing blade 146 via the mixing actuator 130 or other controllable components. In some embodiments, controller 74 will control the ratio by controlling the pH level of the compound solution 30 by coupling acidic and/or basic solution tanks 150 to the doser 31 and/or the mixing chamber 33. The acidic and basic solution tank(s) 150 may introduce an acidic solution or a basic solution via the pH doser actuator 134a directly into the mixing chamber 33 to adjust the pH level, and/or the acidic and basic solution tank(s) 150 may introduce an acidic solution or a basic solution via the pH doser actuator 134b directly into the doser 31 to adjust the pH level. In some embodiments, the controller 74 will control the ratio by controlling a temperature of the flocculant material within the doser 31, the temperature of the wastewater entering the mixing chamber 33, and/or the temperature of the compound solution 30 within the mixing chamber 33, by controlling, for example, a heating element (e.g., similar to the heating actuator 138) coupled thereto.

In other embodiments, a dewatering system (e.g., the flocculation dosing system 10) may be utilized in manufacturing processes, e.g., food manufacturing processes, manufacturing concrete, etc. In general, the topography or surface roughness sensing assembly 26 can be utilized with any material support structure or open channel system carrying or supporting a slurry, viscous, and/or flowable material (e.g., sand, the compound solution 30, etc.). In one embodiment, the sensing assembly 26 can measure a physical property of a material that is moveable through the open channel system by calculating a cross sectional profile of the material based on the surface topography of the material. For example, as the flowable material moves through the open channel system, the surface sensing assembly 26 determines the surface topography of the flowable material to calculate a cross sectional profile of the flowable material (e.g., an area of the flowable material above support surface 50) and by measuring the velocity of the flowable material moving through the open channel, a volume of a portion of the flowable material can be determined. By knowing the volume of the flowable material and by knowing the density (or the desired density) of the flowable material, the mass of the flowable material can be determined.

In other embodiments, the surface sensing assembly 26 can be used with an open tank (e.g., an open vessel, container, kettle, etc.) that supports a material (e.g., liquid) with the open tank being stationary relative to the surface sensing assembly 26. The support surface 50 is formed as a part of the open tank to support the material within the tank. In one embodiment, the material can be agitated (e.g., mixed) within the open tank. The surface sensing assembly 26 can measure foaming of the material (e.g., air bubbles formed at the surface of the material) as the material is being agitated by determining the surface topography of the air bubbles. The surface sensing assembly 26 can then control the amount of foaming (e.g., increase or decrease the amount of foaming) based on the surface topography of the air bubbles. In other embodiments, the surface sensing assembly 26 can be used with a microbubble generation system as disclosed within U.S. application Ser. No. 14/719,882, the content of which is incorporated herein by reference. The microbubble generation system includes contaminants (e.g., solid particles) suspended within a liquid contained within the open tank. Microbubbles are introduced within the liquid to carry the contaminants to a surface of the liquid as the microbubbles float to the surface. The surface sensing assembly 26 can determine the surface topography of the contaminants collected at the surface of the liquid to control the microbubble generation system and/or to determine an amount of contaminants collected at the surface.

The particular arrangement of components and method steps illustrated in the drawings are exemplary as some embodiments of the invention include alternate arrangements. In some embodiments, additional or fewer components are included within the system 10. Additionally, in some embodiments, one or more steps of the method 94 are executed simultaneously or partially simultaneously, or are executed in a different order than illustrated.

Although the invention has been described with reference to certain preferred embodiments, variations and modifications exist within the scope and spirit of one or more independent aspects of the invention. Various features and advantages of the invention are set forth in the following claims.

The invention claimed is:
1. A flocculation dosing system comprising:
   a mixing chamber configured to receive wastewater and flocculant material, the mixing chamber configured to mix the wastewater and the flocculant material together to form a compound solution;

a conveyor that receives the compound solution, a liquid content of the compound solution decreasing as the conveyor moves the compound solution from a first end of the conveyor toward a second end of the conveyor; and a surface sensing assembly in communication with the conveyor, the surface sensing assembly including
  a light source directing a light beam toward the compound solution on the conveyor, the light beam forming a scan line on the compound solution,
  a photo-detector capturing an image of at least a portion of the scan line interacting with the compound solution, and
  a controller coupled to the light source, the photo-detector, and at least one actuator, the controller configured to determine an indication of surface topography of the compound solution based on a characteristic of the scan line from the image, the controller also configured to control the at least one actuator to adjust a characteristic of the compound solution based on the indication of surface topography.

2. The flocculation dosing system of claim 1, wherein the surface sensing assembly includes a first lens positioned between the light source and the compound solution, and wherein the light source directs the light beam into the first lens to scatter the light beam to form the scan line.

3. The flocculation dosing system of claim 2, wherein the light source directs the light beam toward the compound solution at an angle between 10 degrees and 80 degrees relative to a support surface of the conveyor.

4. The flocculation dosing system of claim 1, wherein the surface sensing assembly includes a second lens positioned between the photo-detector and the compound solution, and wherein the second lens magnifies the characteristic of the scan line captured by the photo-detector.

5. The flocculation dosing system of claim 4, wherein the photo-detector is oriented relative to a support surface of the conveyor at an angle that is between 10 degrees and 90 degrees.

6. The flocculation dosing system of claim 1, wherein the controller is configured to compare the indication of surface topography with a desired surface topography parameter, and wherein the controller is configured to control the at least one actuator to adjust the characteristic of the compound solution in response to comparing the indication of surface topography with the desired surface topography parameter.

7. The flocculation dosing system of claim 6, wherein the controller is configured to control the at least one actuator to regulate a ratio of the wastewater and the flocculant material received within the mixing chamber.

8. The flocculation dosing system of claim 7, wherein the at least one actuator is configured to control an amount of the flocculant material received within the mixing chamber, and wherein the at least one actuator is positioned between a doser configured to contain the flocculant material and the mixing chamber.

9. The flocculation dosing system of claim 7, wherein the at least one actuator is configured to control an amount of the wastewater entering the mixing chamber, and wherein the at least one actuator is positioned upstream relative to the mixing chamber.

10. The flocculation dosing system of claim 6, wherein the at least one actuator is configured to adjust the characteristic of the compound solution by at least one item selected from the group consisting of controlling a mixing rate of the flocculant material and the wastewater within the mixing chamber, controlling a pH level of the compound solution contained within the mixing chamber, controlling a temperature of at least a portion of the compound solution, and controlling a speed of the conveyor.

11. A surface sensing assembly in communication with a material having a variable surface topography, the surface sensing assembly comprising:
  a light source directing a light beam toward the material, the light beam forming a scan line on the material, the scan line interacting with the material such that the scan line includes a degree of straightness;
  a photo-detector capturing an image of at least a portion of the scan line including the degree of straightness; and
  a controller coupled to the light source, the photo-detector, and at least one actuator, the controller configured to determine an indication of surface topography of the material based on the degree of straightness of the scan line from the image, the controller also configured to control the at least one actuator to adjust a characteristic of the material based on the indication of surface topography.

12. The surface sensing assembly of claim 11, further comprising a first lens positioned between the light source and the material, and wherein the light source directs the light beam into the first lens to scatter the light beam to form the scan line.

13. The surface sensing assembly of claim 12, wherein the light source directs the light beam toward the material at an angle between 10 degrees and 80 degrees relative to a support surface supporting the material.

14. The surface sensing assembly of claim 11, further comprising a second lens positioned between the photo-detector and the material, and wherein the second lens magnifies the characteristic of the scan line captured by the photo-detector.

15. The surface sensing assembly of claim 14, wherein the photo-detector is oriented relative to a support surface supporting the material at an angle that is between 10 degrees and 90 degrees.

16. The surface sensing assembly of claim 11, wherein the controller is configured to compare the indication of surface topography with a desired surface topography parameter.

17. The surface sensing assembly of claim 16, wherein the controller is configured to control the at least one actuator to adjust the characteristic of the material in response to comparing the indication of surface topography with the desired surface topography parameter.

18. The surface sensing assembly of claim 11, wherein the photo-detector is a camera, and wherein the image is a two-dimensional image including a portion of the material and the portion of the scan line.

19. A method of controlling a desired surface topography of a material having a variable surface topography, the method comprising:
  directing a light beam from a light source toward the material;
  forming a scan line from the light beam on the material, the scan line interacting with the material such that the scan line includes a degree of straightness;
  capturing, by a photo-detector, an image of at least a portion of the scan line including the degree of straightness;
  generating, by a controller, an indication of surface topography of the material based on the degree of straightness of the scan line from the image; and controlling, by the controller, at least one actuator to adjust a characteristic of the material based on the indication of surface topography.

\* \* \* \* \*